United States Patent
Li et al.

(10) Patent No.: US 11,347,501 B1
(45) Date of Patent: May 31, 2022

(54) SHAPE-BASED CODE COMPARISONS

(71) Applicant: International Business Machines Corporation, Armonk, NY (US)

(72) Inventors: Xiao-Yu Li, Beijing (CN); Hua Wei Fan, Beijing (CN); Xin Zhao, Beijing (CN); Hong Wei Sun, Beijing (CN); Zheng Lei An, Beijing (CN); Jiangang Deng, Beijing (CN); Zhou Wen Ya, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/121,805

(22) Filed: Dec. 15, 2020

(51) Int. Cl.
*G06F 9/44* (2018.01)
*G06F 8/71* (2018.01)
*G06F 8/41* (2018.01)

(52) U.S. Cl.
CPC .................. *G06F 8/71* (2013.01); *G06F 8/42* (2013.01); *G06F 8/447* (2013.01)

(58) Field of Classification Search
None
See application file for complete search history.

(56) References Cited

U.S. PATENT DOCUMENTS

| | | |
|---|---|---|
| 6,983,446 B2 | 1/2006 | Charisius et al. |
| 8,181,167 B2 | 5/2012 | Zhao |
| 10,209,963 B2 | 2/2019 | Hutchison |
| 10,276,061 B2 | 4/2019 | Chong et al. |
| 10,606,570 B2 * | 3/2020 | Yoshida .................. G06F 8/427 |

FOREIGN PATENT DOCUMENTS

WO 2017107154 A1 6/2017

OTHER PUBLICATIONS

Iulian Neamtiu et al., "Understanding Source Code Evolution Using Abstract Syntax Tree Matching", 2005 (Year: 2005).*
Sephane Ducasse et al., "A Language Independent Approach for Detecting Duplicated Code", 1999 (Year: 1999).*
Michel Chilowicz et al., "Syntax tree fingerprinting for source code similarity detection", 2009 (Year: 2009).*

(Continued)

*Primary Examiner* — Wei Y Zhen
*Assistant Examiner* — Lanny N Ung
(74) *Attorney, Agent, or Firm* — Cantor Colburn LLP; Edward Wixted

(57) ABSTRACT

Aspects include generating a matrix based on a first sample of source code. Each cell in the matrix can correspond to a unique element in the source code. Each unique element can be encoded to a predetermined value according to an encoding rule. A first waveform is generated by combining a left-side curve and a right-side curve. The left-side curve encodes a first position of non-zero cells in each row of the matrix and the right-side curve encodes a last position of non-zero cells in each row of the matrix. A second sample of source code is identified that matches the first sample of source code based on a comparison of the first waveform to a second waveform constructed from the second sample of source code.

18 Claims, 14 Drawing Sheets

(56) References Cited

OTHER PUBLICATIONS

ChenL, OzsuM, OriaV., "Robust and fast similarity search formoving object trajectories," In: Proceedings of the 2005 ACM SIGMOD, Int'l Conf. on management of data. (Year: 2005) 12 pages.

H.A It, "The computational geommetry of comparing shapes," in EffiCient Algorithms. Springer, (Year:2009), pp. 235-248.

Keogh, E. J., "Exact Indexing of Dynamic Time Warping," In Proc. 28th Int'l Conf. on Very Large Data Bases. Hong Kong, China, (Year: 2002) pp. 406-417.

Xie D, Li F, Phillips JM., "Distributed Trajectory Similarity Search," Pvldb. (Year: 2017), 1478-1489.

* cited by examiner

SHAPE-BASED CODE COMPARISONS

BACKGROUND

The present invention generally relates to computer systems, and more specifically, to computer systems, computer-implemented methods, and computer program products to perform shape-based code comparisons.

Computer instructions are written in source code. Software development is a process of writing and maintaining this source code. In a broader sense, software development includes all that is involved between the conception of desired software and the final manifestation of that software, ideally in a planned and structured process. Software development can include research, development, prototyping, deployment, modification, reuse, re-engineering, maintenance, or any other activities that result in software products.

Code review is the examination of source code for mistakes or unintended consequences (e.g., bugs) overlooked by the code's author. Code review is an important procedure for improving the overall quality of software and is cost-effective because it is less expensive to find and fix mistakes before they become part of a deployed product. Although a skilled programmer can understand source code and can review source code to determine what the code is designed to accomplish, thorough code review for highly complex software systems having arbitrarily large code bases can be extremely challenging, often requiring teams of programmers for completion.

Many companies employ a formal code review process to organize the various code review participants, ensuring that the largest possible number of software bugs and other issues are caught before the release of software. Some software developers use specialized software tools for code review. Such code review tools offer various functionality for streamlining or improving a collaborative code review process, such as by allowing programmers to collaboratively inspect and discuss code changes while storing the history of the code changes for future reference.

SUMMARY

Embodiments of the present invention are directed to shape-based code comparisons. A non-limiting example computer-implemented method includes generating a matrix based on a first sample of source code. Each cell in the matrix can correspond to a unique element in the source code. Each unique element can be encoded to a predetermined value according to an encoding rule. A first waveform is generated by combining a left-side curve and a right-side curve. The left-side curve encodes a first position of non-zero cells in each row of the matrix and the right-side curve encodes a last position of non-zero cells in each row of the matrix. A second sample of source code is identified that matches the first sample of source code based on a comparison of the first waveform to a second waveform constructed from the second sample of source code.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
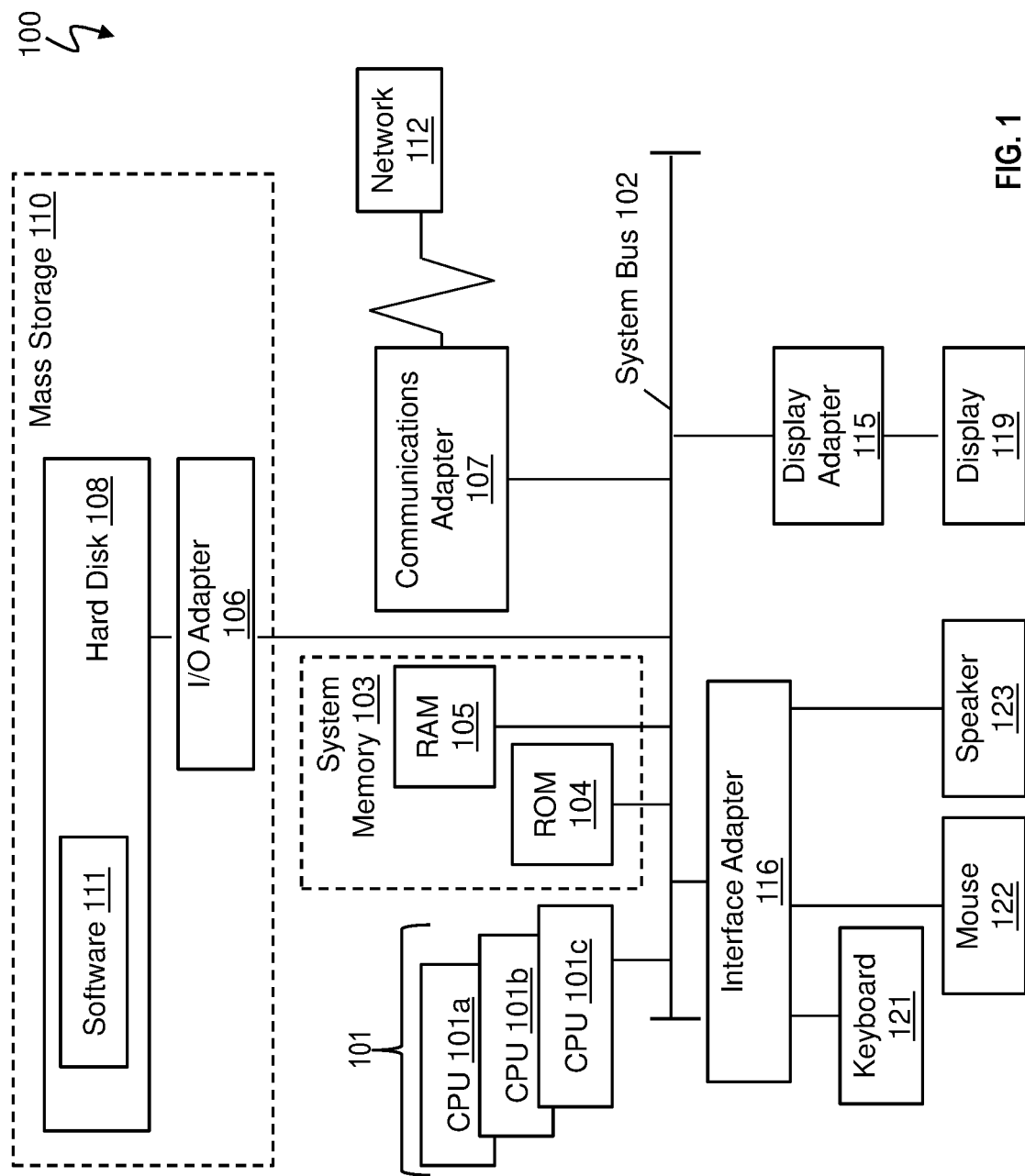
FIG. 1 depicts a block diagram of an example computer system for use in conjunction with one or more embodiments of the present invention.

Effective code review is integral to the overall software development process. For highly complex software systems, however, especially those having large and disparate code bases stored in separate files, code review can be incredibly challenging and frustrating. Specialized software tools have been created to aid in the code review process. While code review tools offer various functionality for streamlining or improving a collaborative code review process, currently available tools are somewhat limited.

An important component of code review is the comparison of a prior version of a piece of software to a new (possibly proposed) version of that same software. This process is often referred to as versioning. Several situations can arise during code review when comparing different versions of the same source code against itself that current code review tools have difficulty handling, leading to code review errors or manual intervention by a domain matter expert. For example, the same function can occur in the two separate files at two different positions within their respective file. Current code review tools have difficulty identifying the common function when that function occurs in different relative places in the different code versions. In another example, one or more functions and/or variable names can be changed between the two files while the underlying logic remains the same. Current code review tools have difficulty recognizing that the underlying logic is the same, irrespective of the "labels" for those elements. In yet another example, a function can be moved to new location with minor changes in the new version. For a specific example, compare a first version of code "a=b+c" against a second version of the code "a=b+c; c++". The only difference is that the new version of the code includes an increment for c (i.e., "c++"). With current comparison tools, it is hard to match a prior version of a function to its corresponding one when even simple changes have been included.

One or more embodiments of the present invention address one or more of the above-described shortcomings by providing computer-implemented methods, computing systems, and computer program products configured to perform shape-based code comparisons for code review. In some embodiments, each version of a piece of source code is transformed into a novel waveform structure. These waveforms can be constructed to preserve and encode the underlying syntax and logic. In some embodiments of the invention, code similarity evaluations can be based on a shape-based comparison of these waveforms rather than on a direct textual comparison of the source code versions themselves. Advantageously, a shape-based, graphical representation or model of the source code can help to organize and visually simplify the structure and components of the different code versions. Using these waveforms, structural and behavioral code similarities can be easily visualized, documented, and identified across code versions, even in arbitrarily complex systems.

Embodiments of the present invention describe a new kind of view for code differences—one based on waveforms rather than the strict text of the underlying code. Such an approach allows an entirely new way to think about source code comparisons, providing a more complete understanding of the underlying source code and versioning. Moreover, aspects of the present invention (such as the waveform generation itself) do not require any changes to the conventional compile process, meaning that these approaches can be leveraged against legacy code bases. Waveform shaped-based code comparisons enables an intuitive approach to developers when analyzing different source code versions.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node (e.g., a node 10 of FIG. 13 below). Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
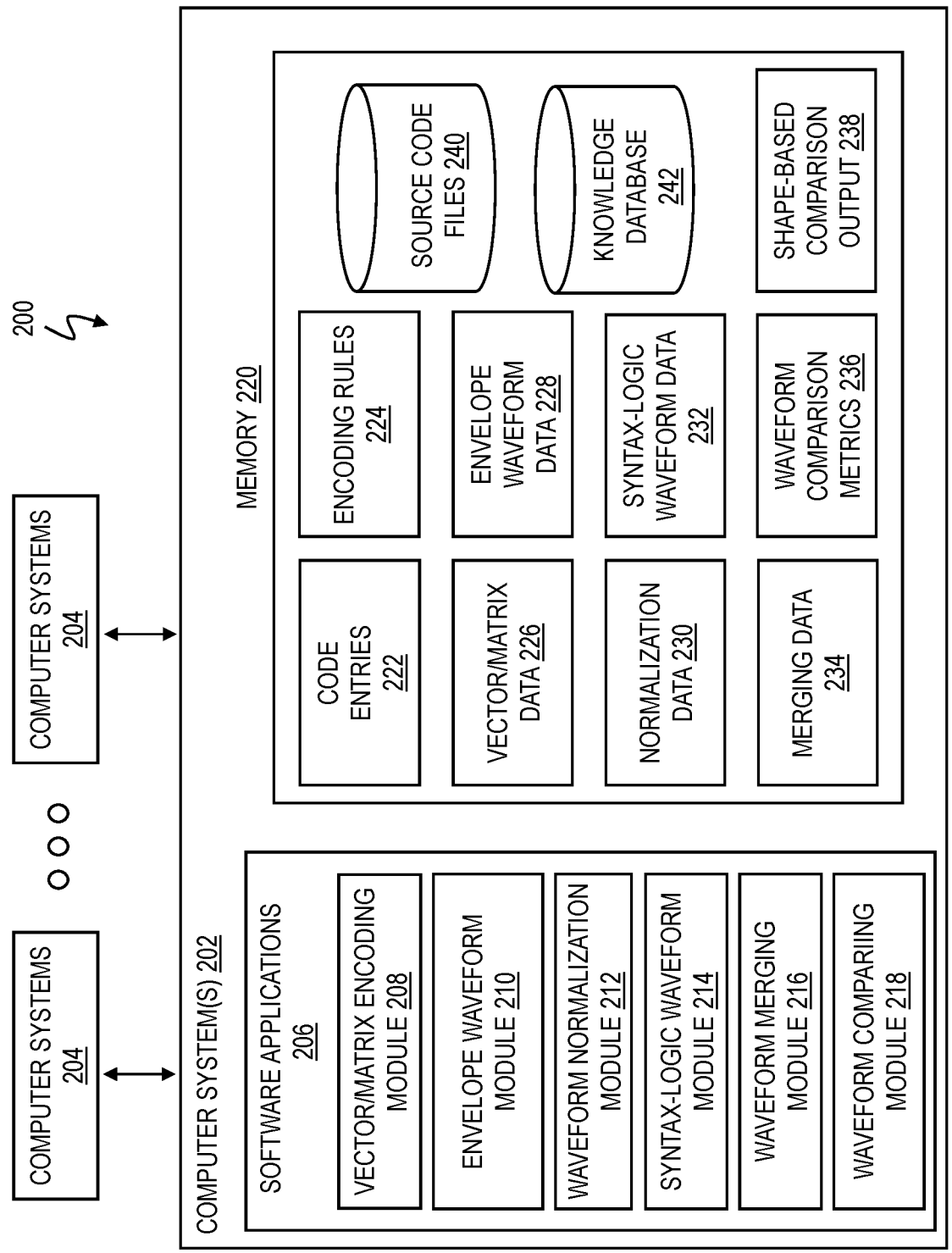
FIG. 2 is a block diagram of a system for shape-based code comparisons in accordance with one or more embodiments of the present invention.

FIG. 2 is a block diagram of a system 200 for shape-based code comparisons in accordance with one or more embodiments of the present invention. FIG. 2 depicts one or more computer systems 202 coupled to one or more computer systems 204 via a wired and/or wireless network. For example, computer system 202 can be representative of one or more cloud-based resources (e.g. remote computers, etc.) and computer systems 204 can be representative of numerous client (local) computers. One or more of the computer systems 202 can be configured to perform a shape-based code comparison at the request of the computer systems 204. Elements of the computer system 100 of FIG. 1 may be used in and/or integrated into computer systems 202 and computer systems 204. In some embodiments of the invention, computation is done direct at the local level. In other words, elements of the computer system 202 can instead (or in addition) be elements of the computer systems 204.

One or more software applications 206 can include a vector/matrix encoding module 208, an envelope waveform module 210, a waveform normalization module 212, a syntax/logic waveform module 214, a waveform merging module 216, and a waveform comparing module 218. The software applications 206 may utilize and/or be implemented as software 111 executed on one or more processors 101, as discussed in FIG. 1.

Figure 3:
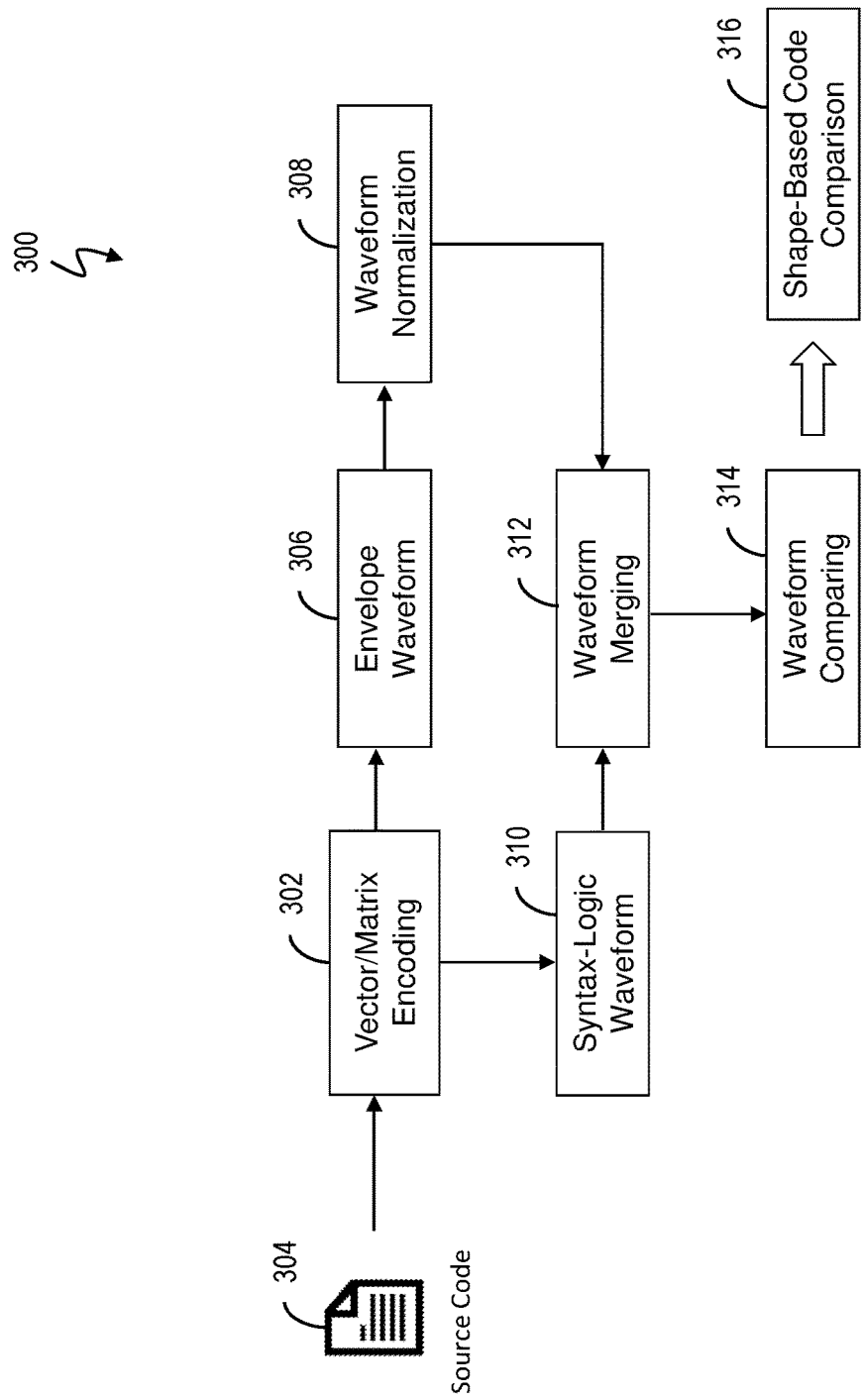
FIG. 3 is a block diagram of a dataflow for shape-based code comparisons in accordance with one or more embodiments of the present invention.

Memory 220 of the computer systems 202 can store, for example, a plurality of code entries 222 (e.g., source code data), encoding rules 224, vector/matrix data 226, envelope waveform data 228, normalization data 230, syntax-logic waveform data 232, merging data 234, waveform comparison metrics 236, and shape-based comparison output 238. A dataflow 300 of FIG. 3 illustrates interactions between various components of the software applications 206 and memory 220 of FIG. 2 for shape-based code comparisons.

In some embodiments of the invention, the vector/matrix encoding module 208 is configured to retrieve source code data from source code files 240. In some embodiments of the invention, the source code data can be provided by a user of the computer systems 202 and/or 204. In some embodiments of the present invention, the vector/matrix encoding module 208 can store the source code data as code entries 222. In some embodiments of the invention, the code entries 222 include a first version of a source code and a second version of a source code.

Figure 4:
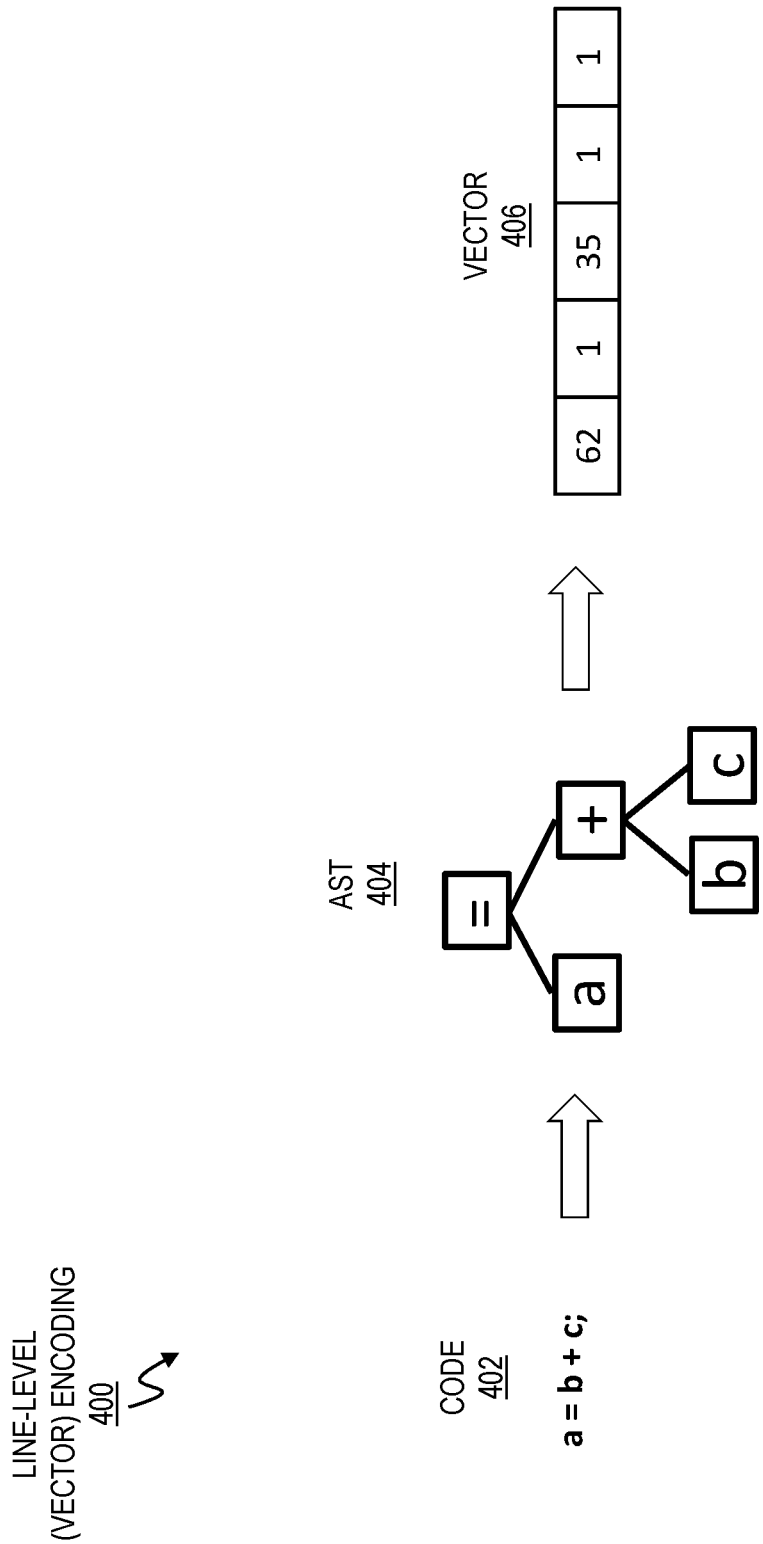
FIG. 4 illustrates an example line-level (vector) encoding of a sample code in accordance with one or more embodiments of the present invention.

The vector/matrix encoding module 208 can be configured to transform the code entries 222 into one of more vectors using encoding rules 224. In some embodiments of the invention, these vectors can be combined to define a matrix. The vectors and/or matrix data can be stored as vector/matrix data 226. In some embodiments of the invention, each line of the source code is converted into an abstract structure tree (AST, also referred to as an abstract syntax tree) using known processes. For example, an AST can be built as the result of the syntax analysis phase of a compiler. In some embodiments of the invention, the AST is then encoded as a vector using the encoding rules 224. This line-by-line process can be referred to as line-level (or vector) encoding. FIG. 4 illustrates an example line-level (vector) encoding 400 of a sample code 402 having the elements "a=b+c". As shown in FIG. 4, the code 402 is converted into an AST 404 prior to being encoded as a vector 406 (the vector [1, 62, 35, 1, 1]).

In some embodiments of the invention, each unique element found in the AST will be encoded to a predetermined value according to the encoding rules 224. An example set of encoding rules is shown below in Table 1 for ease of discussion. It is understood that other encoding rules are possible and that the selection of a specific value for a given syntax element type is arbitrary.

TABLE 1

| Encoding Rules | | |
| --- | --- | --- |
| Type | Scope | Value (range) |
| Indentation | — | 0 |
| Variable | a, b, c . . . | 1 |
| Function | — | 2 |
| Class-definition | — | 3 |
| Type-declaration | int, char . . . | 5-20 (c-9, py-6) |
| Operator | +, −, *, / . . . | 30-90 (c-34, py-56) |
| Keywords | enum, typedef . . . | 100-130 |
| Import | include(c), import(python) | 140-160 |
| Control-Flow | for, while . . . switch | 170-180 |

Continuing with the example encoding rules of Table 1, the "indentation" element can be encoded to the value "0" while the type-declaration element "int" can be encoded to the value "5". The control-flow element "for" can be encoded to the value "170". In this manner, each element in the AST 404 (e.g., "a", "=", "b", etc.) can be converted into a predetermined value. These values can define successive elements in the vector 406. Continuing with the previous example, the line of code "a=b+c" can be encoded as the vector [1, 62, 35, 1, 1], assuming that "62" encodes the "=" sign, "35" encodes the "+" operator, and "1" encodes a variable (a, b, c). In other words, each line of source code can be encoded into a vector of digital values in the sequence of AST elements.

Figure 5:
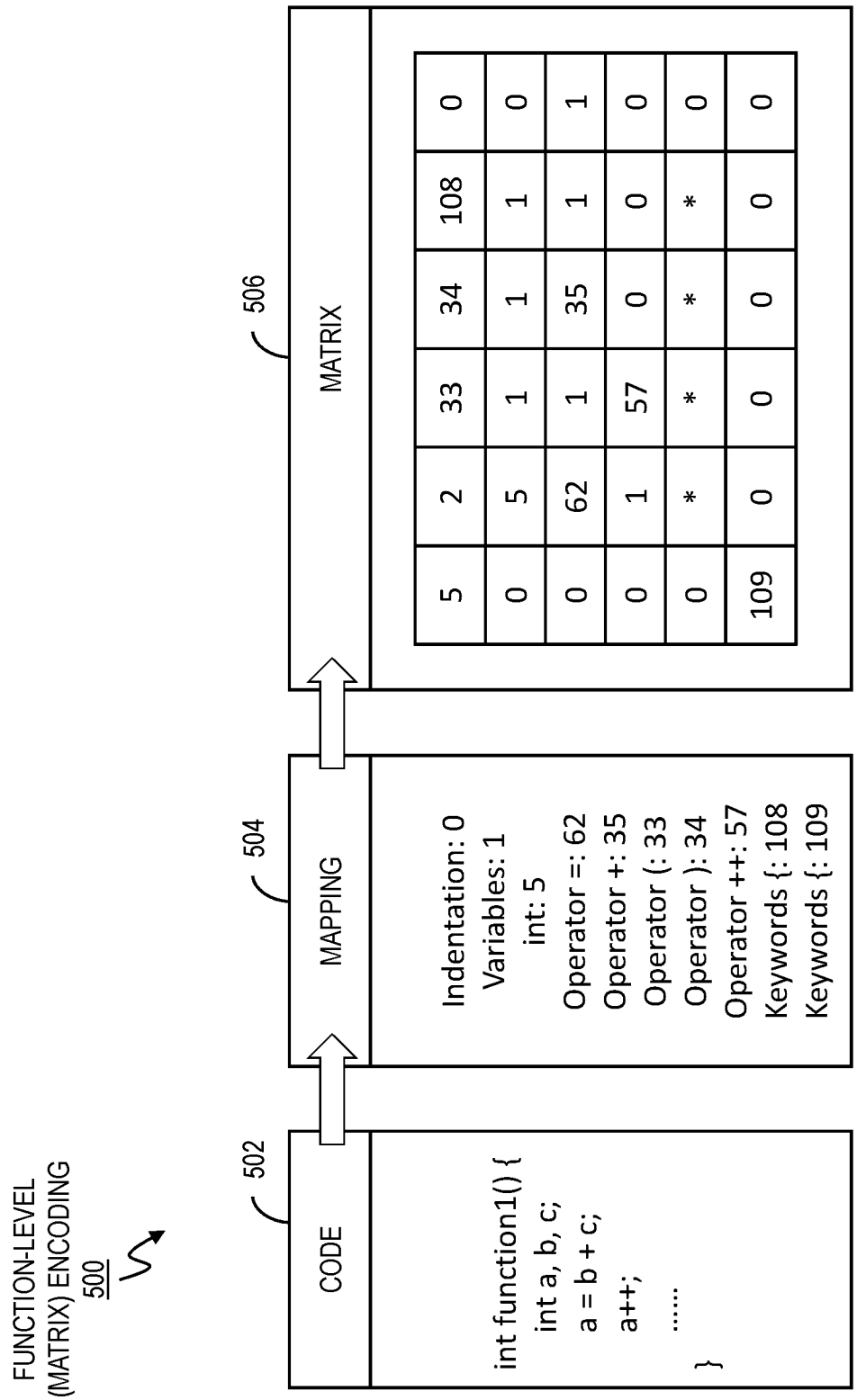
FIG. 5 illustrates an example function-level (matrix) encoding of a sample code in accordance with one or more embodiments of the present invention.

In some embodiments of the invention, this line-by-line encoding process is repeated for all lines in a function and the resultant vectors are combined to define a function-level encoded matrix. FIG. 5 illustrates an example function-level (matrix) encoding 500 of a sample code 502 having a first line "int function1( ) {", a second line "int a, b, c;", a third line "a=b+c;", a fourth line "a++;", and one or more additional lines "}" As shown in FIG. 5, the code 502 can be converted using a mapping 504 (e.g., encoding rules 224) into a matrix 508.

In some embodiments of the invention, the size of the matrix 508 is defined dynamically by the size of the function itself. Consider, for example, a function having N lines and further consider that M is maximum number of elements in any of the lines. The matrix 508 can be initialized as an N×M matrix. In some embodiments of the invention, the matrix 508 is initialized with the leading indent (i.e., the first indentation, usually in the second line) handled as valid syntax element having an encode value of "0", although other configurations are within the contemplated scope of the invention. In some embodiments of the invention, mirrored leading indents (e.g., all lines start indented 1 time, 2 times, etc.) can be ignored.

In some embodiments of the invention, the vector/matrix data 226 can be passed to the envelope waveform module 210. In some embodiments of the invention, the envelope waveform module 210 is configured to transform an encoded matrix into a waveform (referred to as an envelope waveform). In some embodiments of the present invention, the envelope waveform module 210 can store the waveform as envelope waveform data 228.

In some embodiments of the invention, an envelope curve is generated by connecting a first curve (left side of the envelope) to a second curve (right side of the envelope) in a manner which preserves the number of elements and the indent information encoded in the matrix. In some embodiments of the invention, the left-side curve can be formed by connecting the first position of non-zero cells in each row of the matrix. In some embodiments of the invention, the right-side curve can be formed by connecting the last position of non-zero cells in each row of the matrix. Connecting the ends of these curse defines a closed envelope curve.

Figure 6:
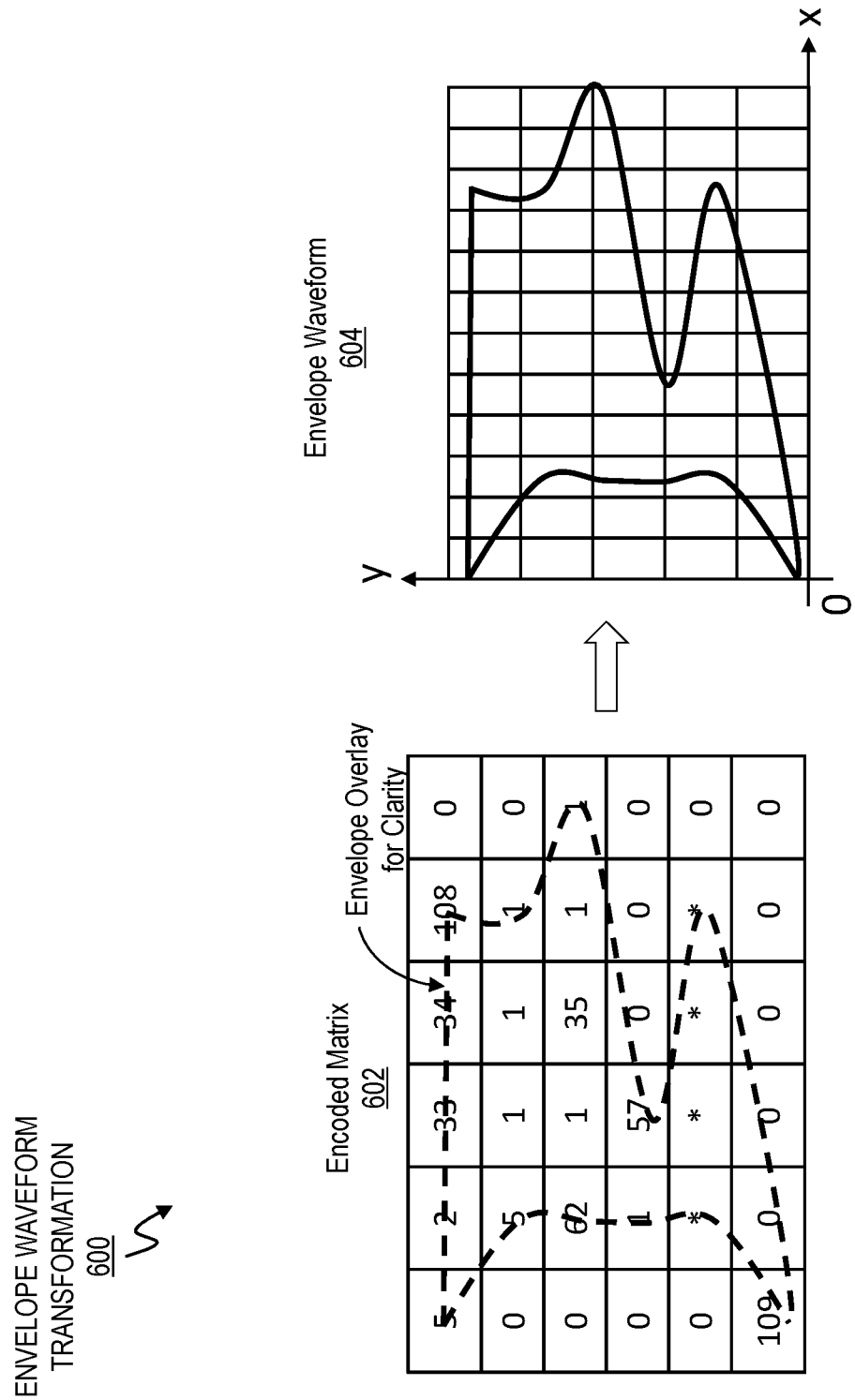
FIG. 6 illustrates an example envelope waveform transformation in accordance with one or more embodiments of the present invention.

FIG. 6 illustrates an example envelope waveform transformation 600 of an encoded matrix 602 into an envelope waveform 604. For clarity, an overlay of the envelope waveform 604 is shown superimposed over the encoded matrix 602. It is understood that this overlay is not required and presented merely for ease of discussion. As shown in FIG. 6, the envelope waveform 604 preserves the overall structure of the matrix, including per-line length information at the syntax level as well as the total size (number of lines) of the matrix. As the matrix itself is an encoding of a piece of source code, such as a function, the envelope waveform 604 preserves the overall structure (e.g., number of variables, code size/line totals, indent information, etc.) of the underlying code as well. As further shown in FIG. 6, the envelope waveform 604 can be fit to a coordinate system. In some embodiments of the invention, the leading edge (bottom leftmost point) of the envelope waveform 604 defines the origin of the coordinate system, although other configurations are possible.

In some embodiments of the invention, the envelope waveform data 228 can be passed to the waveform normalization module 212. In some embodiments of the invention, the waveform normalization module 212 is configured to normalize an incoming envelope waveform. In some embodiments of the present invention, the waveform normalization module 212 can store the normalized waveform as normalization data 230.

Figure 7:
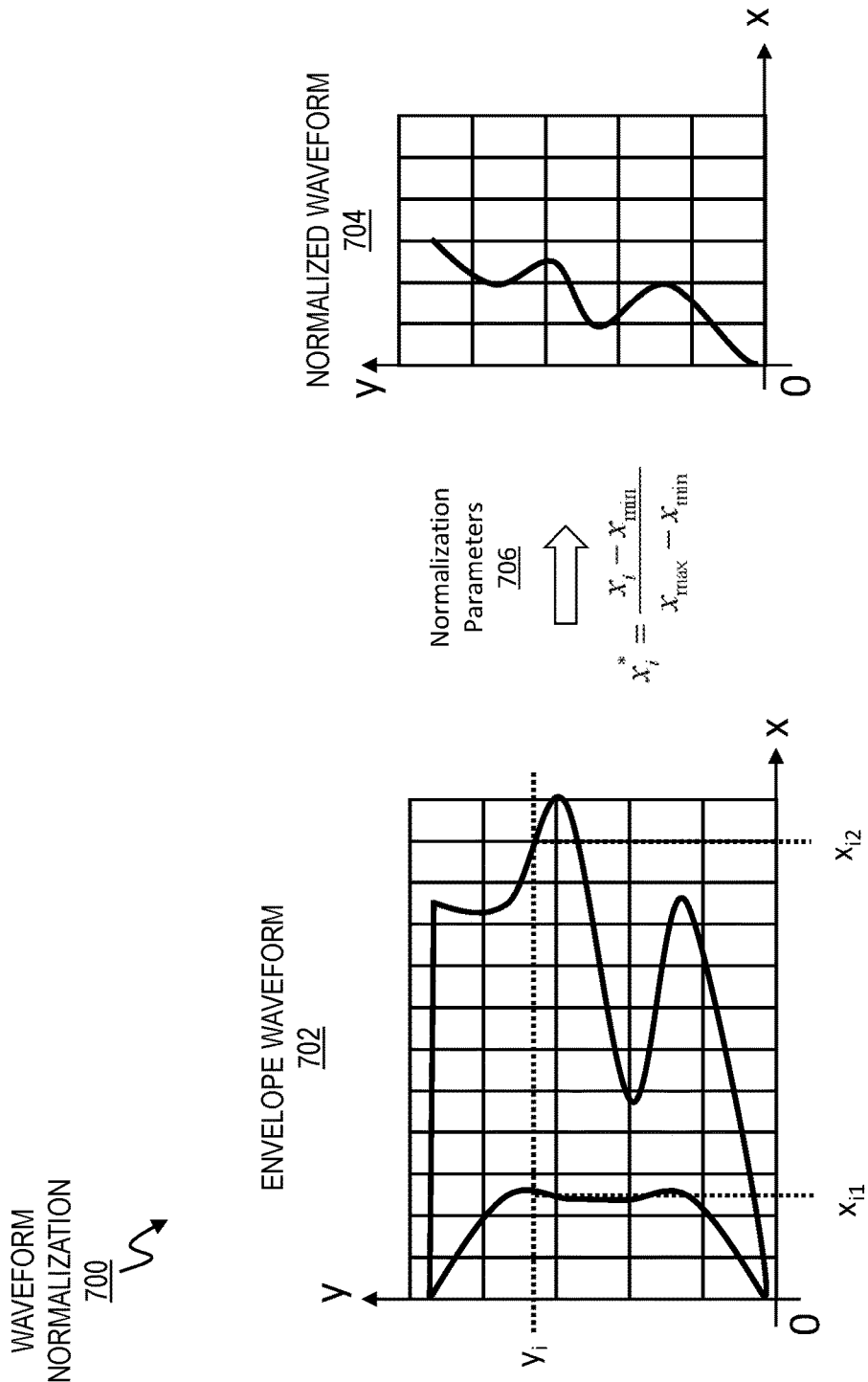
FIG. 7 illustrates an example waveform normalization in accordance with one or more embodiments of the present invention.

As used herein, normalizing a waveform refers to a translation operation where an incoming envelope waveform (having a left-side and right-side curve) is transformed into a single curve waveform. FIG. 7 illustrates an example waveform normalization 700. As shown in FIG. 7, an envelope waveform 702 can be normalized into a single curve waveform (e.g., the normalized waveform 704) using normalization parameters 706. A variety of curve normalization techniques are known and can be used for this translation, and the specific normalization parameters 706 chosen are not meant to be particularly limited. In some embodiments of the invention, the normalized waveform 704 is generated using min-max normalization (formula 1):

$$x_i = x_{i2} - x_{i1}, x_{min} = \min\{x_i\}, x_{max} = \max\{x_i\} \tag{1}$$

Here, given a value of $y_i$ (the relative height along the y-axis of the points as measured from the coordinate origin), two x values, $x_{i1}$ and $x_{i2}$, can be determined as shown in FIG. 7. $X_{i1}$ represents the distance along the x-axis of the left-side curve at the intersection of $y_i$ as measured from the coordinate origin, while $x_{i2}$ is the distance along the x-axis of the right-side curve at the intersection of $y_i$. Using formula 1, the value $x_i$ is defined as the distance between these two curves at the chosen value for $y_i$. As the value of $y_i$ can be arbitrarily selected, it is understood that any desired level of granularity for the normalization can be achieved by increasing or decreasing the distance between adjacent y values. In some embodiments of the invention, a normalized waveform point $x_i^*$ is determined for each $y_i$ using the min-max normalization method of formula 1. Normalized waveform 704 illustrates an example waveform normalization using this procedure.

In some embodiments of the invention, the vector/matrix data 226 can be passed to the syntax-logic waveform module 214. This process can be in serial or parallel (in either order) with the vector/matrix data 226 passed to the envelope waveform module 210. In some embodiments of the invention, the syntax-logic waveform module 214 is configured to transform an encoded matrix into a second waveform (referred to as a syntax-logic waveform). In some embodiments of the present invention, the syntax-logic waveform module 214 can store the waveform as syntax-logic waveform data 232.

Continuing with the previous example of the encoding rules shown in Table 1, the value of each cell in the encoded matrix (e.g., the encoded matrix 602 in FIG. 6) will have a value in [0, $v_{max}$], where $v_{max}$ is the highest "value" in the encoding table (e.g., in our example Table 1, $v_{max}$ would be "180" for the control-flow element "switch"). We can further define a midpoint value $v_{mid} = v_{max}/2$ (e.g., in our example, "90"). In some embodiments of the invention, a coordinate system for the syntax-logic waveform is defined relative to the point $v_{mid}$ at the origin. In some embodiments of the invention, each point $x_i$ (corresponding to each cell in the matrix) on either side of $v_{avg}$ can be determined according to the formula:

$$x_i = v - v_{avg} \tag{2}$$

In some embodiments of the invention, each point $x_i$ is connected to adjacent points with a straight line (in other words, according to the order of points in each row). The syntax-logic waveform 804 shown in FIG. 8 illustrates a waveform constructed in this manner.

Figure 8:
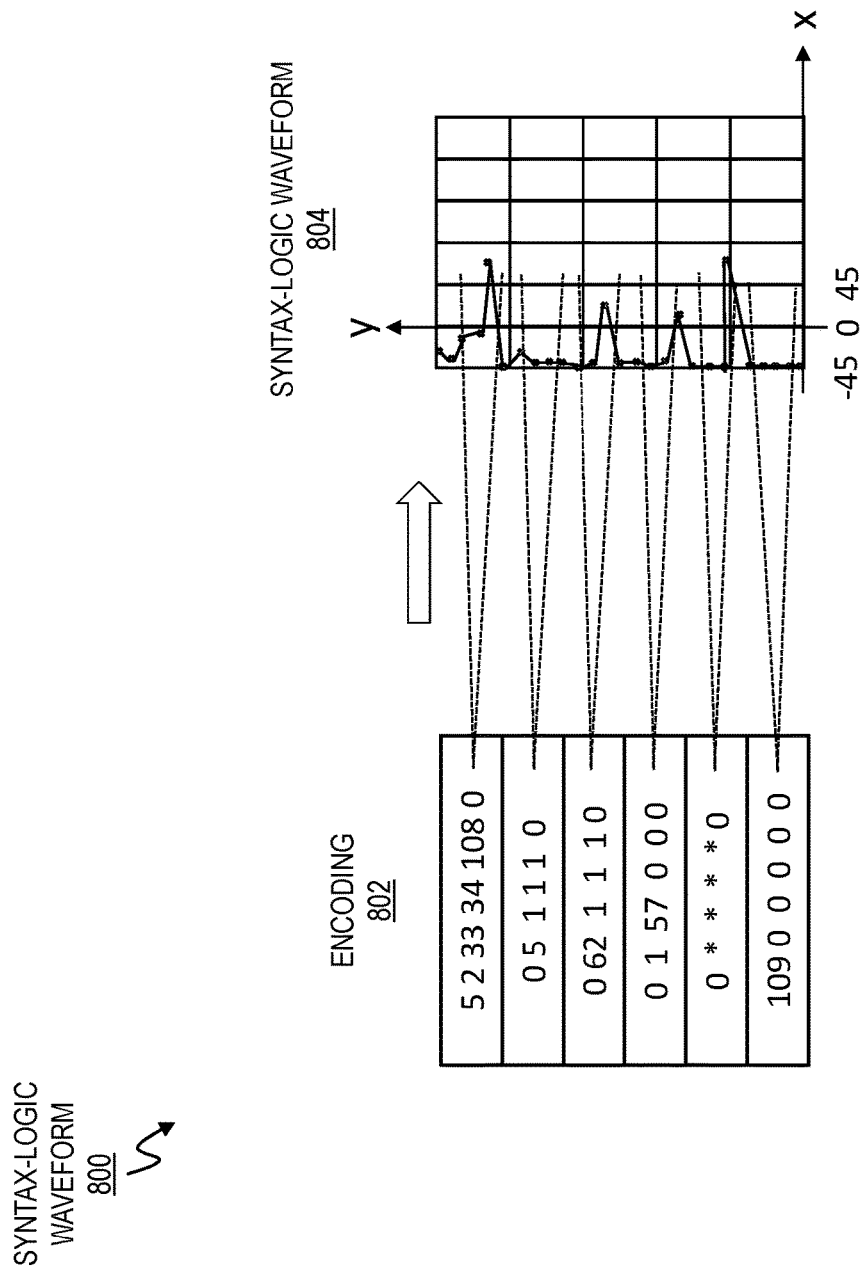
FIG. 8 illustrates an example syntax-logic waveform in accordance with one or more embodiments of the present invention.

While the envelope waveform discussed with respect to FIGS. 6 and 7 represents a type of encoding of the overall "structure" of the source data, the syntax-logic waveform discussed with respect to FIG. 8 represents a type of encoding of the underlying logic of the source data. In some embodiments of the invention, the normalized envelope waveform (e.g., normalized waveform 704) and the syntax-logic waveform (e.g., syntax-logic waveform 804) are combined.

Figure 9:
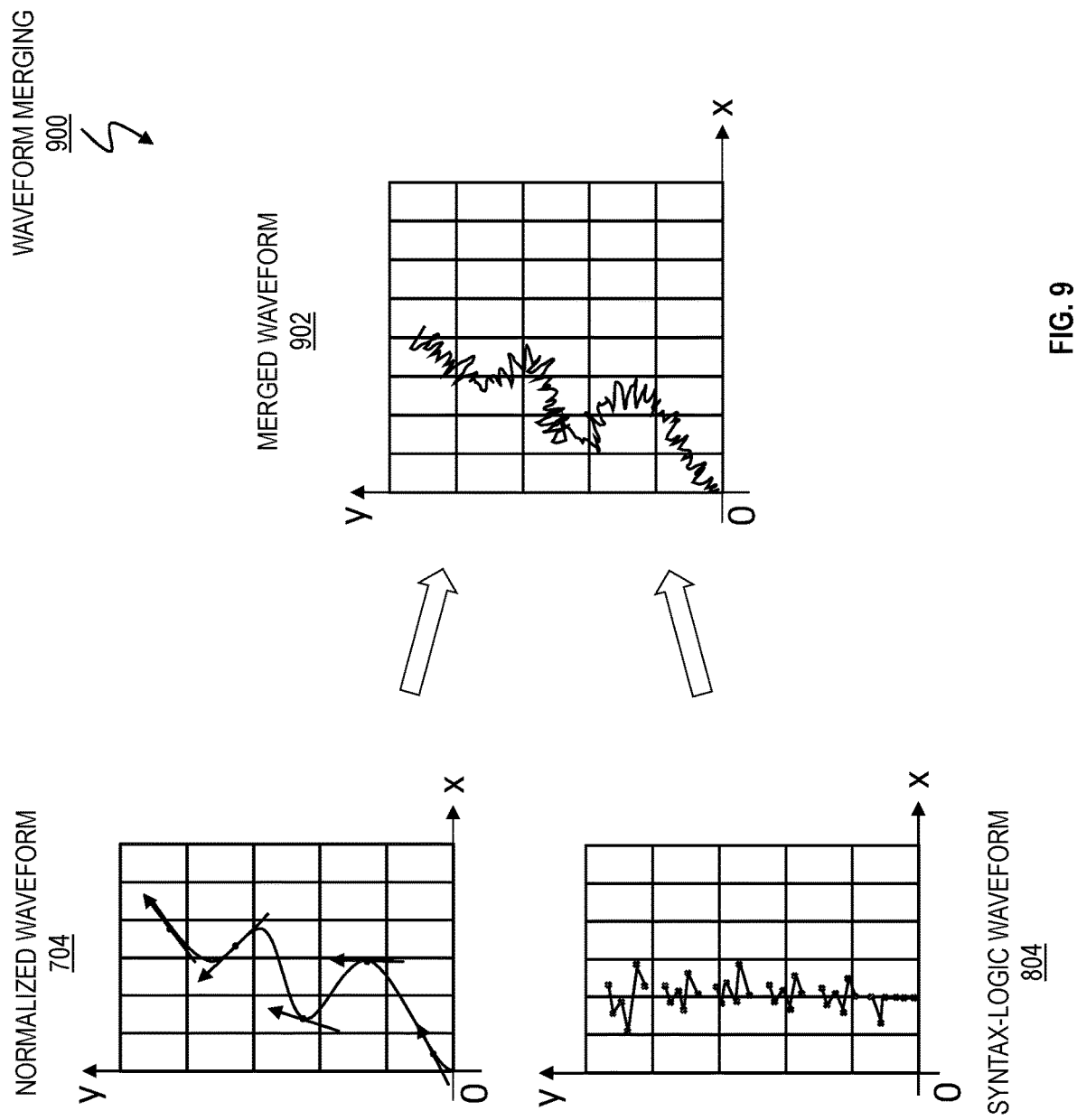
FIG. 9 illustrates an example waveform merging operation in accordance with one or more embodiments of the present invention.

In some embodiments of the invention, the normalization data 230 and the syntax-logic waveform data 232 can be passed to the waveform merging module 216. In some embodiments of the invention, the waveform merging module 216 is configured to merge an encoded envelope waveform with a syntax-logic waveform. In some embodiments of the present invention, the waveform merging module 216 can store the merged waveform as merging data 232. FIG. 9 illustrates an example waveform merging operation.

In some embodiments of the invention, waveform merging relies on the alignment of the respective coordinate systems and a translation of each point on the syntax-logic waveform to a point on the normalized waveform coordinate system. As illustrated in FIG. 9, each point of the normalized waveform is shifted left or right according to the relative shift of each respective point in the syntax-logic waveform. Consider the normalized waveform 704 as a curve $y=f(x)$ having various points, $P(x_o, y_o)$. At each point, $f'(x)$ is a derived function $k=f'(X_o)$ representing the gradient or tangent line at the point P. In some embodiments of the invention, the gradient(k) of each point P is determined. In some embodiments of the invention, the relative axis for each point Q in the syntax-logic waveform 804 is rotated to align with the direction of the tangent line at the corresponding point P (note that P and Q are related as both are defined by the same cell in the original matrix). In other words, at each point P, a shift left or right is determined based on the point Q, while the direction (axis alignment) of that directional shift is defined by the tangent line at P. In this manner the envelope waveform and the syntax-logic waveform can be merged into a single merged waveform 902.

Figure 10:
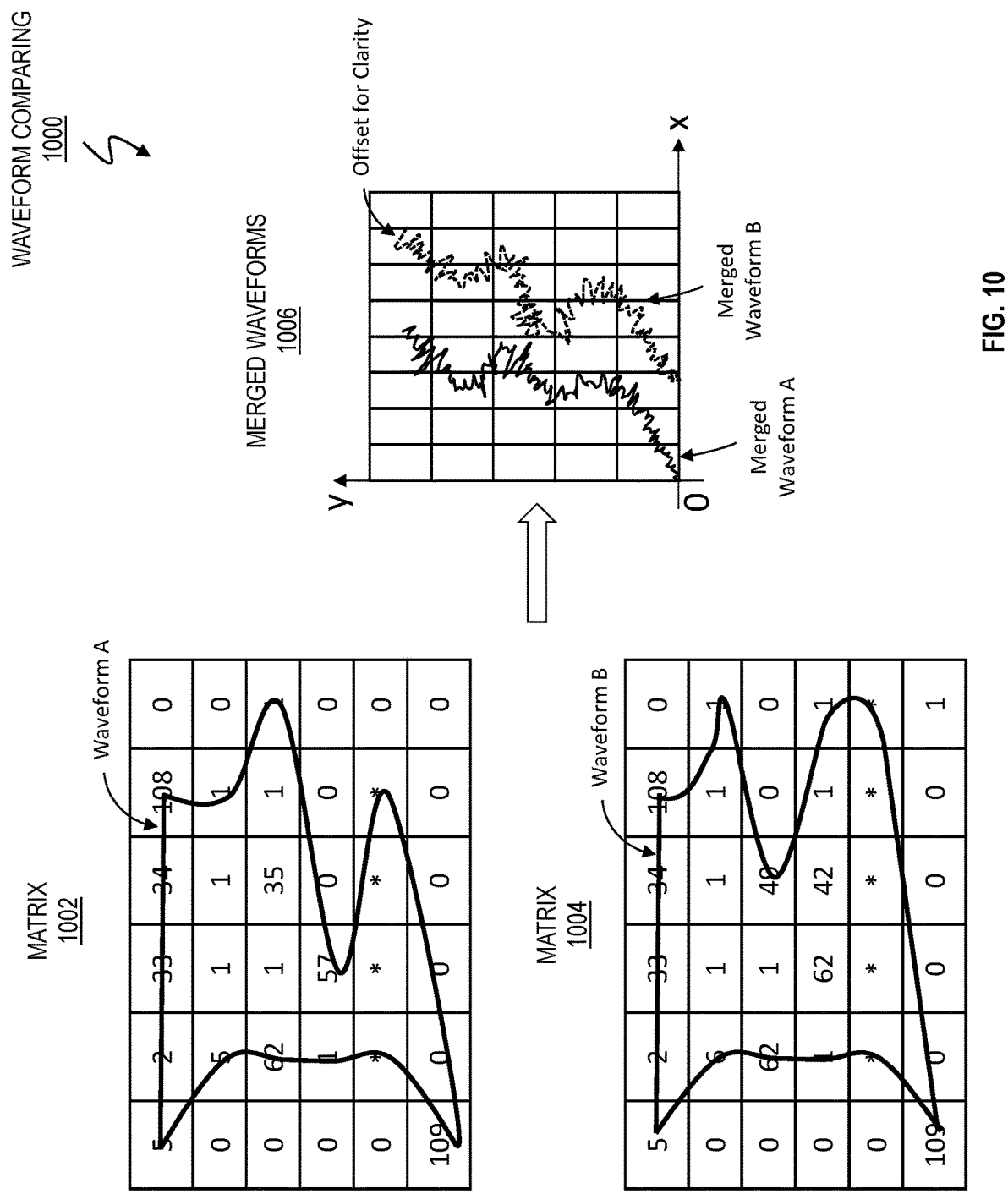
FIG. 10 illustrates an example waveform comparison operation in accordance with one or more embodiments of the present invention.

In some embodiments of the invention, two or more merged waveforms can be received at the waveform comparing module 218. In some embodiments of the invention, the waveform comparing module 218 is configured to compare waveforms using a distance measure. In some embodiments of the present invention, the waveform comparing module 218 can store the comparisons as waveform comparison metrics 236. FIG. 10 illustrates an example waveform comparison operation of a first matrix 1002 and a second matrix 1004. As shown in FIG. 10, each matrix can be represented with an envelope waveform (e.g., waveforms A and B). Moreover, each matrix can be transformed into a merged waveform according to one or more embodiments of the present invention. In some embodiments of the invention, these merged waveforms can be placed over a common coordinate system and aligned to the origin (note that as shown in FIG. 10, the merged waveform B has been shifted for clarity) so that differences between the curves are readily visible.

In some embodiments of the invention, a distance value (also referred as a difference measure) can be determined between two or more waveforms. In some embodiments of the invention, a threshold distance value can be defined below which two or more waveforms are considered matching. The distance value can be determined using one or more of several techniques known for calculating a distance between curves, such as, for example, point-base distances (Euclidean distances, dynamic time warping (DTW), Longest Common Subsequences (LCSS) distance, and Edit Distance on Real sequence (EDR) distance), Hausdorff distances, Frechet distances, segment-based distances (one way distance, locality in-between polylines (LIP) distance), and task-specific distances (trajectory clustering such as TRACLUS, as well as road, semantic, and grid clustering). These techniques are illustrative, and others are possible and within the contemplated scope of the invention.

Figure 11:
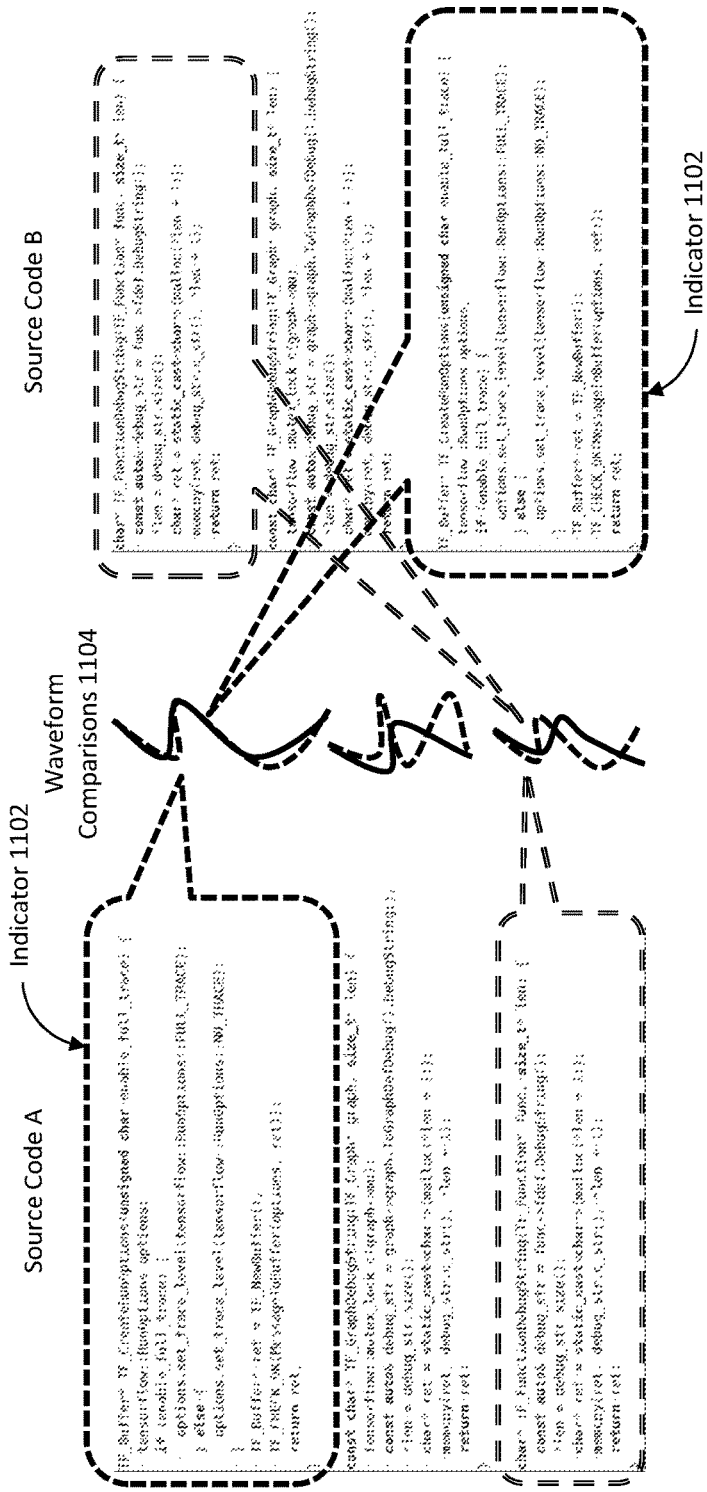
FIG. 11 illustrates an example shape-based comparison output in accordance with one or more embodiments of the present invention.

In some embodiments of the invention, the waveform comparing module 218 is further configured to generate a shape-based comparison output 238 for two or more code entries 222. The shape-based comparison output 238 can be provided (e.g., displayed) on a user interface, for example via the displayer adaptor 115 depicted in FIG. 1. In this manner, a shape-based comparison of the various versions of the source code can be visually inspected by a user. FIG. 11 illustrates an example shape-based code comparison output 1100 of a first piece of source code (e.g., source code A) and a second piece of source code (e.g., source code B).

As shown in FIG. 11, the source code A can be presented on the left side of the display, the source code B can be presented on the right side of the display, and the corresponding waveform comparisons can be presented between the pieces of source code. This arrangement is illustrative, and other arrangements are possible.

Each function in a first piece of source code (e.g., source code A) will have a most similar corresponding function in a second piece of source code (e.g., source code B). In some embodiments of the invention, the middle view depicts each function's and it's most similar corresponding function's normalized envelope wave with their respective starting points aligned in the vertical direction. In some embodiments of the invention, the shape-based comparison output 238 includes a visual indicator (e.g., visual indicator 1102) highlighting the matching code. In some embodiments of the invention, the visual indicator includes a pointer or reference to a waveform comparison (e.g., waveform comparisons 1104).

In some embodiments of the invention, each waveform is provided with a selectable or highlightable link, which, upon selection or pass-over (e.g., mouse pass-over) by a user, will highlight it's function code (via, e.g., the indicator 1102). For example, when the envelope is clicked, two dashed boxes can be drawn around the functions in the left and right views. In some embodiments of the invention, the focus point of the middle view will automatically change according the relative position of the user's mouse in the provided source code. In other words, moving the mouse in the dashed boxes (e.g., from line to line in the code) can result in dynamically changing the position or focus of the waveform comparisons 1104.

In some embodiments of the invention, a waveform fitting degree (parameter) can show the statistical similarity degree of the source code comparisons (according, e.g., to the chosen distance measure). In some embodiments of the invention, the middle view can be zoomed in and out to dynamically change the sampling frequency of the merged waves. For example, a higher zoom magnification can result in increasing the sampling frequency, so that the merged wave will show more detail. In some embodiments of the invention, the middle view can also be drawn (as an alternative or supplement to the base waveform comparisons 1104) as two standard sine waves according to a wave configuration which can be set by user. The degree of deviation in the horizontal direction of the two standard sine waves can indicate the similar degree of the underlying functions (according, e.g., to a dynamic time warping result or other distance measure). In some embodiments of the invention, the sine waves can be interacted with in a similar manner as the waveform comparisons 1104 (upon selection or mouse pass-over for additional information, etc.).

Referring back to FIG. 3, a block diagram of a dataflow 300 of shape-based code comparison is generally shown in accordance with one or more embodiments of the present invention. As shown in FIG. 3, the dataflow can begin with vector/matrix encoding 302. In some embodiments of the invention, vector/matrix encoding 302 encodes received source code 304 into one or more vectors and one or more matrices as discussed with respect to the vector/matrix encoding module 208 of FIG. 2. In some embodiments of the invention, the source code 304 includes a first version of source code and a second version of the source code.

In some embodiments of the invention, an envelope waveform 306 is constructed based on the encoded matrices, in a similar manner as discussed with respect to the envelope waveform module 210 of FIG. 2. A waveform normalization 308 can be constructed based on the envelope waveform 306, in a similar manner as discussed with respect to the waveform normalization module 212 of FIG. 2.

In some embodiments of the invention, a syntax-logic waveform 310 is constructed based on the encoded matrices, in a similar manner as discussed with respect to the syntax-logic waveform module 214 of FIG. 2. The envelope waveform module 210 and the syntax-logic waveform 310 can be run in serial (either occurring first) or parallel.

In some embodiments of the invention, the normalized waveform and the syntax-logic waveform undergo waveform merging 312, in a similar manner as discussed with respect to the waveform merging module 216 of FIG. 2. In some embodiments of the invention, the merged waveform from a first sample of source code is compared against a merged waveform from a second sample of source code, in a similar manner as discussed with respect to the waveform comparing module 218 of FIG. 2.

In some embodiments of the invention, one or more matching pieces of source code can be discovered. In some embodiments of the invention, the matching pieces of source code can be packaged and provided to a system or user (e.g., via user interface module 218). For example, a shape-based code comparison 316 (comparison output) can be generated according to one or more embodiments. An example output is depicted in FIG. 11.

Figure 12:
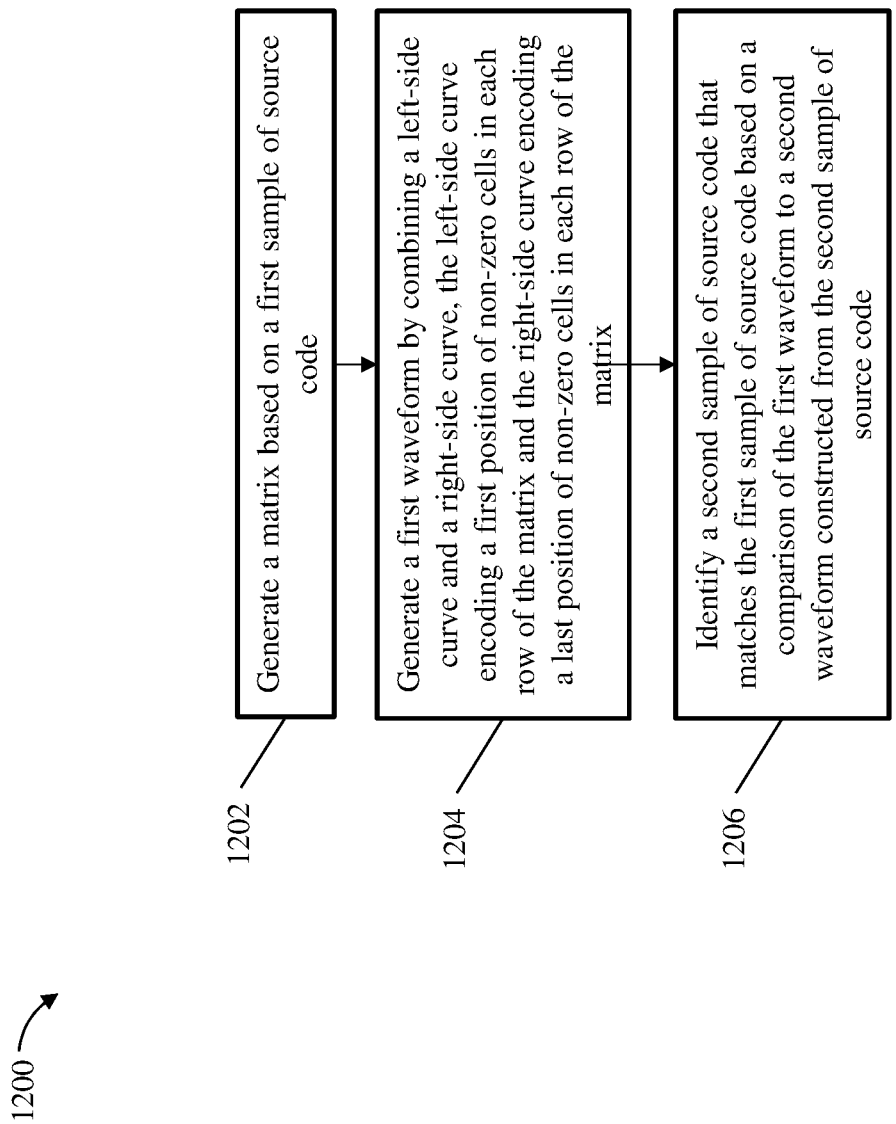
FIG. 12 is a flowchart for shape-based code comparisons in accordance with one or more embodiments of the present invention.

Referring now to FIG. 12, a flowchart 1200 for providing shape-based code comparisons is generally shown according to an embodiment. The flowchart 1200 is described in reference to FIGS. 1-11 and may include additional steps not depicted in FIG. 12. Although depicted in a particular order, the blocks depicted in FIG. 12 can be rearranged, subdivided, and/or combined. At block 1202, a matrix is generated based on a first sample of source code. In some embodiments of the invention, each cell in the matrix corresponds to a unique element in the first sample of source code. In some embodiments of the invention, each unique element is encoded to a predetermined value according to an encoding rule (for example, as described in Table 1). In some embodiments of the invention, source code is converted (or expressed) as an abstract structure tree (AST) prior to encoding into the matrix (see, e.g., FIG. 4).

At block 1204, a first waveform is constructed by combining a left-side curve and a right-side curve. In some embodiments of the invention, the left-side curve encodes a first position of non-zero cells in each row of the matrix and the right-side curve encodes a last position of non-zero cells in each row of the matrix.

At block 1206, a second sample of source code is identified that matches the first sample of source code based on a comparison of the first waveform to a second waveform constructed from the second sample of source code. In some embodiments of the invention, the first sample of source code is stored in a first file and the second sample of source code is stored in a second file, and wherein the first file comprises a first code version of the source code and the second file comprises a second code version of the source code.

In some embodiments of the invention, identifying the second sample of source code comprises determining that a distance value between the first waveform and the second waveform is a smallest distance value between the first waveform and another waveform. In some embodiments of the invention, the first sample is a function that resides in a first source code file and the second sample is a function resides in a second source code file. In other words, for each function in the first source code file a most similar function can be found (as measured against this waveform distance). In some embodiments of the invention, the distance value between the first waveform and the second waveform comprises dynamic time warping.

The method can further include normalizing the first waveform to a single normalized curve. In some embodiments of the invention, each point in the normalized curve is shifted based on a syntax encoding. In some embodiments of the invention, the normalized curve is merged with a syntax-logic waveform that comprises the syntax encoding (see, e.g., FIG. 9). In some embodiments of the invention, identifying the second sample of source code comprises building a first merged waveform for the first sample and a second merged waveform for the second sample, and determining that a distance value between the merged waveforms is below a predetermined threshold.

Platforms and methods that provide shape-based code comparisons according to one of or more embodiments of the present invention offer several technical advantages and benefits over conventional code comparison tools. While conventional code comparison tools have been available for some time, current tools struggle with several common scenarios in code review: moving the same function to a new location, changing function/variable names for the same underlying logic, and the introduction of minor changes to the underlying logic (e.g., adding an increment to a variable such as "a++"). the present invention is able to flexibly identify matching code elements (functions, etc.) among various source code versions in any of these troublesome scenarios by providing a new kind of approach for finding code differences—one based on waveforms and syntax information rather than direct text-to-text comparisons. In short, the present invention can identify matches even when the functions or code elements do not occur in the same location (or even in the same vicinity) or use the same code labels (function names, variables, etc.). The present invention can even identify matches in the face of changes to the underlying logic depending on the threshold waveform distances employed in a given application (in essence, a user of the platform can decide how "close" matching functions need to be by specifying the required waveform distance).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
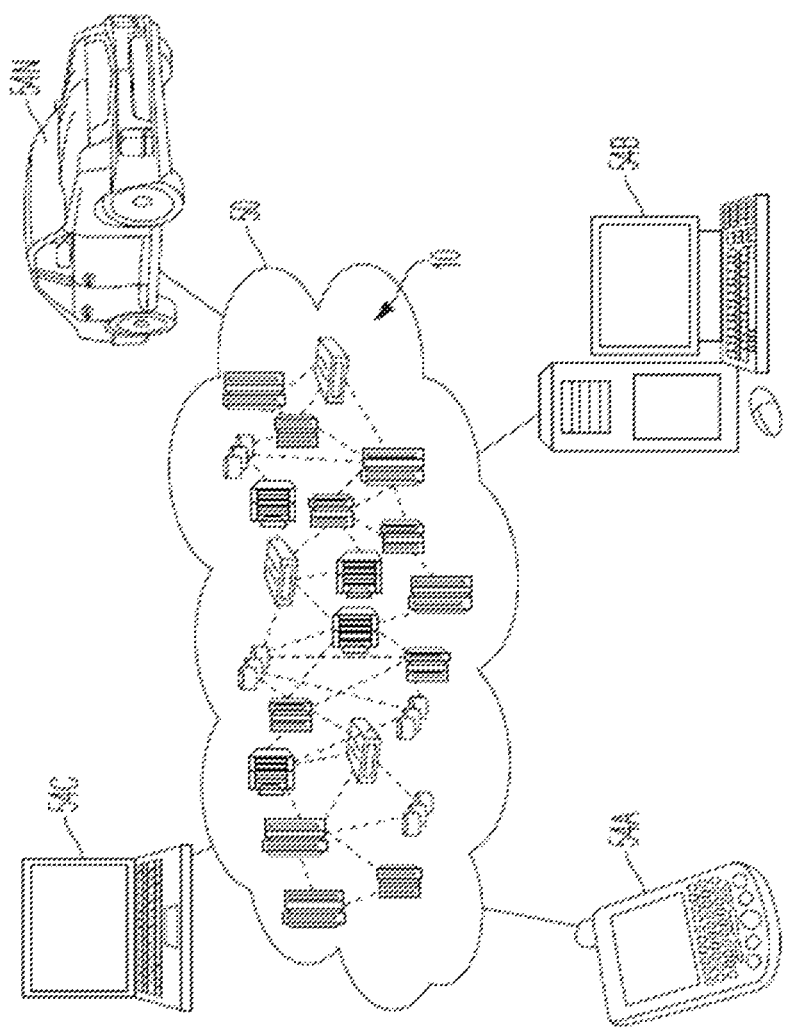
FIG. 13 depicts a cloud computing environment according to one or more embodiments of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
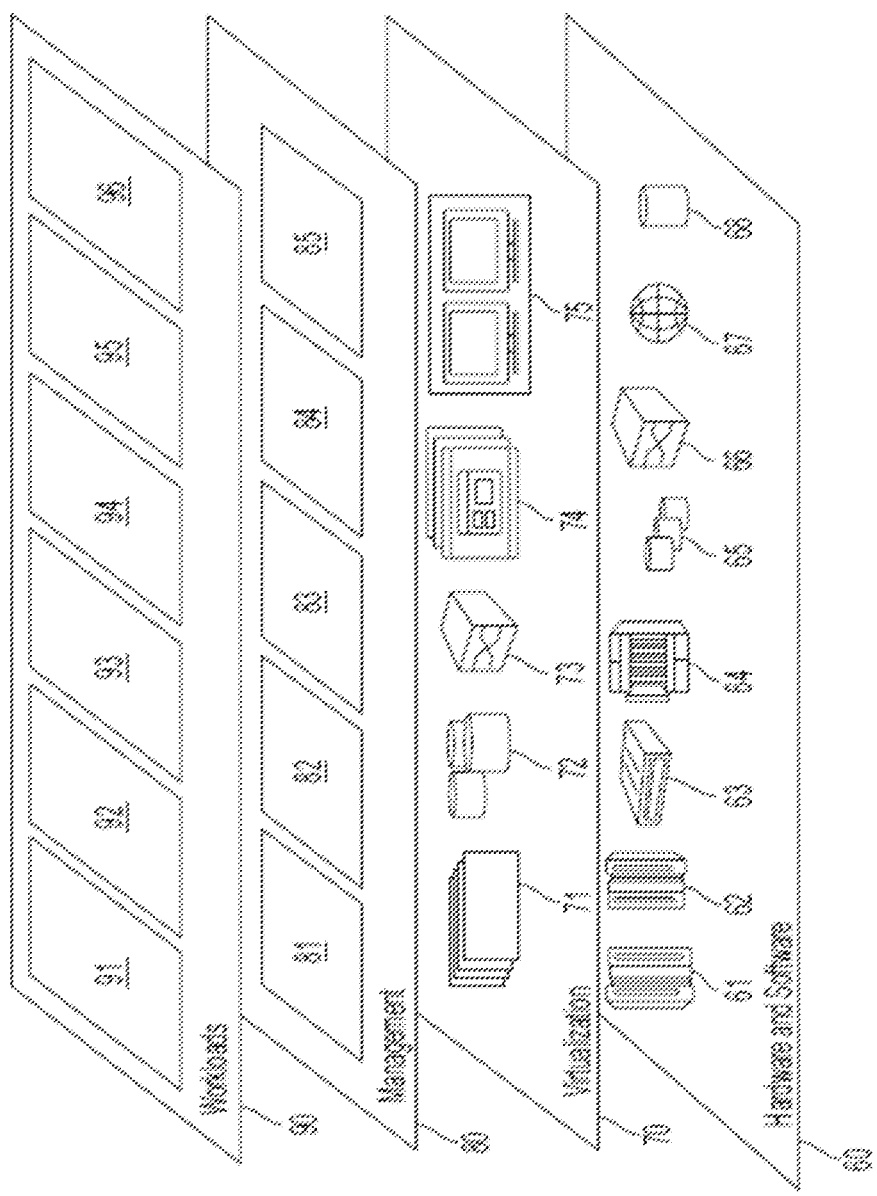
FIG. 14 depicts abstraction model layers according to one or more embodiments of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications 96 (e.g., software applications 206 of FIG. 2), etc. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    generating a matrix based on a first sample of source code, each cell in the matrix corresponding to a unique element in the first sample of source code, wherein each unique element is encoded to a predetermined value according to an encoding rule;
    passing the matrix to an envelope waveform module and a syntax-logic waveform module for parallel processing;
    generating, at the envelope waveform module, a first waveform by combining a left-side curve and a right-side curve, the left-side curve encoding a first position of non-zero cells in each row of the matrix and the right-side curve encoding a last position of non-zero cells in each row of the matrix;
    generating, at the syntax-logic waveform module, a syntax-logic waveform that comprises a syntax encoding of the first sample of source code, wherein the syntax-logic waveform is generated in parallel with the first waveform;
    combining the first waveform and the syntax-logic waveform to define a merged waveform; and
    identifying a second sample of source code that matches the first sample of source code based on a comparison of the merged waveform to a second waveform constructed from the second sample of source code.

2. The computer-implemented method of claim 1, wherein the first sample of source code is stored in a first file and the second sample of source code is stored in a second file, and wherein the first file comprises a first code version of the source code and the second file comprises a second code version of the source code.

3. The computer-implemented method of claim 1, wherein identifying the second sample of source code comprises determining that a distance value between the first waveform and the second waveform is smaller than a distance value between the first waveform and another waveform.

4. The computer-implemented method of claim 3, further comprising generating an abstract structure tree (AST) that encodes the first sample of source code.

5. The computer-implemented method of claim 1 further comprising normalizing the first waveform to a single normalized curve.

6. The computer-implemented method of claim 5 further comprising shifting each point in the normalized curve based on the syntax encoding.

7. A system comprising:
    a memory having computer readable instructions; and
    one or more processors for executing the computer readable instructions, the computer readable instructions controlling the one or more processors to perform operations comprising:
    generating a matrix based on a first sample of source code, each cell in the matrix corresponding to a unique element in the first sample of source code, wherein each unique element is encoded to a predetermined value according to an encoding rule;
    passing the matrix to an envelope waveform module and a syntax-logic waveform module for parallel processing;
    generating, at the envelope waveform module, a first waveform by combining a left-side curve and a right-side curve, the left-side curve encoding a first position of non-zero cells in each row of the matrix and the right-side curve encoding a last position of non-zero cells in each row of the matrix;
    generating, at the syntax-logic waveform module, a syntax-logic waveform that comprises a syntax encoding of the first sample of source code, wherein the syntax-logic waveform is generated in parallel with the first waveform;
    combining the first waveform and the syntax-logic waveform to define a merged waveform; and
    identifying a second sample of source code that matches the first sample of source code based on a comparison of the merged waveform to a second waveform constructed from the second sample of source code.

8. The system of claim 7, wherein the first sample of source code is stored in a first file and the second sample of source code is stored in a second file, and wherein the first file comprises a first code version of the source code and the second file comprises a second code version of the source code.

9. The system of claim 7, wherein identifying the second sample of source code comprises determining that a distance value between the first waveform and the second waveform is a smallest distance value between the first waveform and another waveform.

10. The system of claim 9, further comprising generating an abstract structure tree (AST) that encodes the first sample of source code.

11. The system of claim 7 further comprising normalizing the first waveform to a single normalized curve.

12. The system of claim 11 further comprising shifting each point in the normalized curve based on the syntax encoding.

13. A computer program product comprising a computer readable storage medium having program instructions embodied therewith, the program instructions executable by a processor to cause the processor to perform operations comprising:
    generating a matrix based on a first sample of source code, each cell in the matrix corresponding to a unique element in the first sample of source code, wherein each unique element is encoded to a predetermined value according to an encoding rule;
    passing the matrix to an envelope waveform module and a syntax-logic waveform module for parallel processing;
    generating, at the envelope waveform module, a first waveform by combining a left-side curve and a right-side curve, the left-side curve encoding a first position of non-zero cells in each row of the matrix and the right-side curve encoding a last position of non-zero cells in each row of the matrix;

generating, at the syntax-logic waveform module, a syntax-logic waveform that comprises a syntax encoding of the first sample of source code, wherein the syntax-logic waveform is generated in parallel with the first waveform;

combining the first waveform and the syntax-logic waveform to define a merged waveform; and identifying a second sample of source code that matches the first sample of source code based on a comparison of the merged waveform to a second waveform constructed from the second sample of source code.

14. The computer program product of claim 13, wherein the first sample of source code is stored in a first file and the second sample of source code is stored in a second file, and wherein the first file comprises a first code version of the source code and the second file comprises a second code version of the source code.

15. The computer program product of claim 13, wherein identifying the second sample of source code comprises determining that a distance value between the first waveform and the second waveform is a smallest distance value between the first waveform and another waveform.

16. The computer program product of claim 15, further comprising generating an abstract structure tree (AST) that encodes the first sample of source code.

17. The computer program product of claim 13 further comprising normalizing the first waveform to a single normalized curve.

18. The computer program product of claim 17 further comprising shifting each point in the normalized curve based on the syntax encoding.

* * * * *